United States Patent
Busuioc et al.

(10) Patent No.: US 8,534,739 B2
(45) Date of Patent: Sep. 17, 2013

(54) CROSS CAR BEAM ASSEMBLY INCLUDING REINFORCED POLYMERIZED ELEMENTS

(75) Inventors: Dan Busuioc, Dearborn, MI (US); Gary D. Mullen, Farmington, MI (US); Matthew L. Gabrielli, South Lyon, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 51 days.

(21) Appl. No.: 13/117,914

(22) Filed: May 27, 2011

(65) Prior Publication Data

US 2012/0299333 A1 Nov. 29, 2012

(51) Int. Cl.
*B62D 25/14* (2006.01)

(52) U.S. Cl.
USPC .............................................. 296/72; 180/90

(58) Field of Classification Search
USPC ............................ 296/193.02, 72, 70; 180/90
See application file for complete search history.

(56) References Cited

U.S. PATENT DOCUMENTS

| | | | |
|---|---|---|---|
| 6,152,489 A | 11/2000 | Hedderly et al. | |
| 6,773,321 B1* | 8/2004 | Urquiaga | 446/454 |
| 7,264,295 B2 | 9/2007 | Vander Sluis et al. | |
| 2004/0262954 A1* | 12/2004 | Scheib et al. | 296/193.02 |
| 2005/0264040 A1 | 12/2005 | Bailey et al. | |
| 2007/0290524 A1* | 12/2007 | Szoke et al. | 296/190.08 |
| 2007/0295453 A1 | 12/2007 | Koelman et al. | |
| 2009/0033126 A1* | 2/2009 | Mullen et al. | 296/193.02 |

FOREIGN PATENT DOCUMENTS

WO 0050292 A1 8/2000

OTHER PUBLICATIONS

Johnson Controls et al., EcoSpace Cockpit, Aug. 2007.

* cited by examiner

*Primary Examiner* — Lori Lyjak
(74) *Attorney, Agent, or Firm* — Shook Hardy & Bacon LLP

(57) ABSTRACT

A cross car beam for a vehicle having a molded base, a molded steering column structure attached to the forward side of the driver's side of the molded base, and a molded driver side structure attached to the rearward side of the driver's side of the molded base. One of the molded base, the molded steering column structure, and the molded driver side structure is composed of a polymer or a blend of polymers reinforced with fibers to provide strength. An optional tensile member such as a steel tube is attached to the molded base. The tensile member is composed of a metal or a reinforced polymerized material. One of the molded base, the molded steering column structure, and the molded driver side structure may include a class A surface. Alternatively or in addition a class A part may be attached to one of these structures.

12 Claims, 4 Drawing Sheets

CROSS CAR BEAM ASSEMBLY INCLUDING REINFORCED POLYMERIZED ELEMENTS

TECHNICAL FIELD

The disclosed invention relates generally to cross car beams for vehicles. More particularly, the disclosed invention relates to a cross car beam assembly that includes reinforced polymerized elements. These elements include a main molding, a steering column structure and a driver side structure. Optionally a tensile member composed of a metal or a polymerized material is attached to the main molding. As a further option a foam-in-place component having a class A surface may be attached to the substrate.

BACKGROUND OF THE INVENTION

The typical automotive vehicle includes a cross-car beam attached laterally between opposite sides of the forward portion of the vehicle. The instrument panel assembly is ordinarily attached to the cross-car beam, thus the cross-car beam serves as a substrate for the instrument panel.

It is known today to use stamped steel components in the construction of the conventional cross-car beam. Typically the cross-car beam is constructed from several stamped components or formed steel brackets welded together to form the cross-car beam. This design has the function of providing support for the vehicle structure, the plastic injection molded IP substrate, the steering column, airbag systems and other vehicle modules.

Known cross-car beam structures suffer from a variety of disadvantages. First, it is heavy. This type of system can weigh anywhere between 30 lbs and 50 lbs depending on the size and type of vehicle. The significant weight added to the vehicle according to known designs runs contrary to design goals of overall vehicle weight reduction.

Second, known cross-car beam designs are also package inefficient, requiring an extensive supporting structure behind the instrument panel substrate. In today's vehicle there are many components to be fitted in relation to the instrument panel and the cross-car beam, including without limitation air bags and their related assemblies, the HVAC case, ducting, and the radio/electronics cage. The substantial structure of known cross-car beams takes excess space required by these components leading to the need to design these components with complex and difficult geometries just to fit within the space allotted.

Third, and related to the packaging challenges of known designs, changing the cross-car beam configuration to adapt it to different vehicle interior designs, even in response to relatively minor modifications, is also costly and time-consuming. The known cross-car beam system thus requires a large amount of investment, having as it does many pieces and components to be tooled. A typical steel cross-car beam can have as many as twenty-four components to its assembly, sometimes requiring an investment of about $5,000,000 per plant.

Accordingly, as in so many areas of vehicle technology, there is room in the art of cross-car beam design for an alternative configuration that provides effective protection that can be adapted to a variety of shapes while maintaining relatively low manufacturing and assembly costs.

SUMMARY OF THE INVENTION

The present invention generally provides a cross car beam for a vehicle having a molded base, a molded steering column structure attached to the forward side of the driver's side of the molded base, and a molded driver side structure attached to the rearward side of the driver's side of the molded base.

One of the molded base, the molded steering column structure, and the molded driver side structure is composed of a polymer or a blend of polymers reinforced with fibers to provide strength to the structure. The three injection molded components are vibration welded and bolted together.

The molded steering column structure and the molded driver side structure are interchangeable with other similar structures. Optionally a tensile member such as a steel tube is attached to the molded base. The tensile member is composed of a metal or a reinforced polymerized material.

A component having a class A surface may be attached to one of the molded base, the molded steering column structure, and the molded driver side structure. The component having the class A surface may be a foam-in-place component.

The disclosed invention offers several advantages over known cross-car beam designs. First, the cross-car beam design according to the disclosed invention offers a significant reduction in weight over known designs, providing a weight savings of between about 50% and 60% over known designs, resulting in a weight reduction of between about 10 lbs to 15 lbs, depending on vehicle type.

A second advantage of the disclosed invention is improved packaging. By eliminating most of the steel structure behind the instrument panel substrate more room is available for package space.

Third, the disclosed invention provides a significant manufacturing cost advantage over known systems. Particularly, the disclosed invention may provide an investment savings of about 50% or about $2,500,000 per plant.

Other advantages and features of the invention will become apparent when viewed in light of the detailed description of the preferred embodiment when taken in conjunction with the attached drawings and the appended claims.

BRIEF DESCRIPTION OF THE DRAWINGS

For a more complete understanding of this invention, reference should now be made to the embodiments illustrated in greater detail in the accompanying drawings and described below by way of examples of the invention wherein.

DETAILED DESCRIPTION OF THE PREFERRED EMBODIMENT

Figure 1:
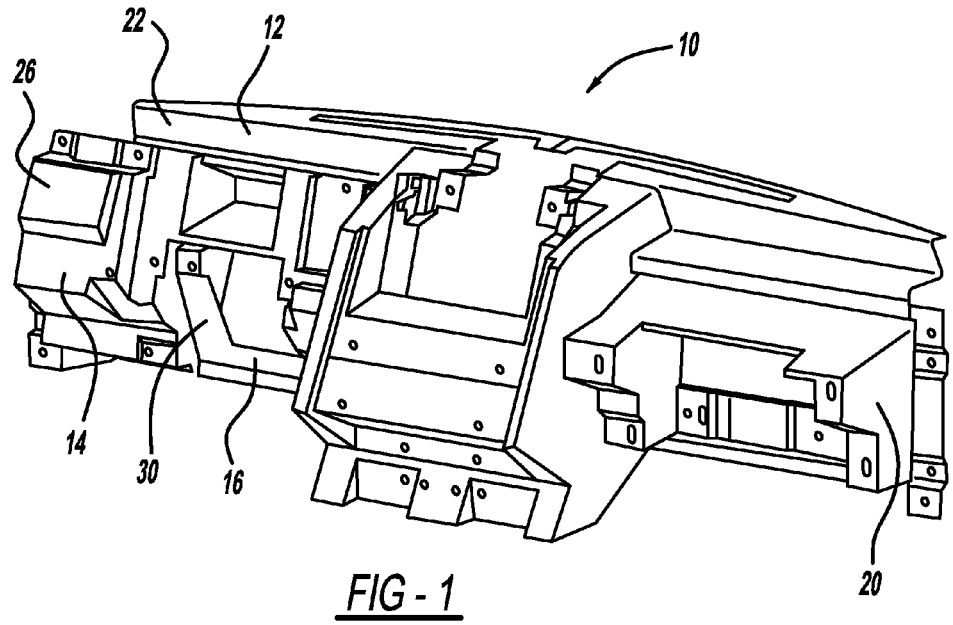
FIG. 1 illustrates a front perspective view of a cross-car beam assembly according to a preferred embodiment of the disclosed invention.

In the following figures, the same reference numerals will be used to refer to the same components. In the following description, various operating parameters and components are described for different constructed embodiments. These specific parameters and components are included as examples and are not meant to be limiting.

Figure 2:
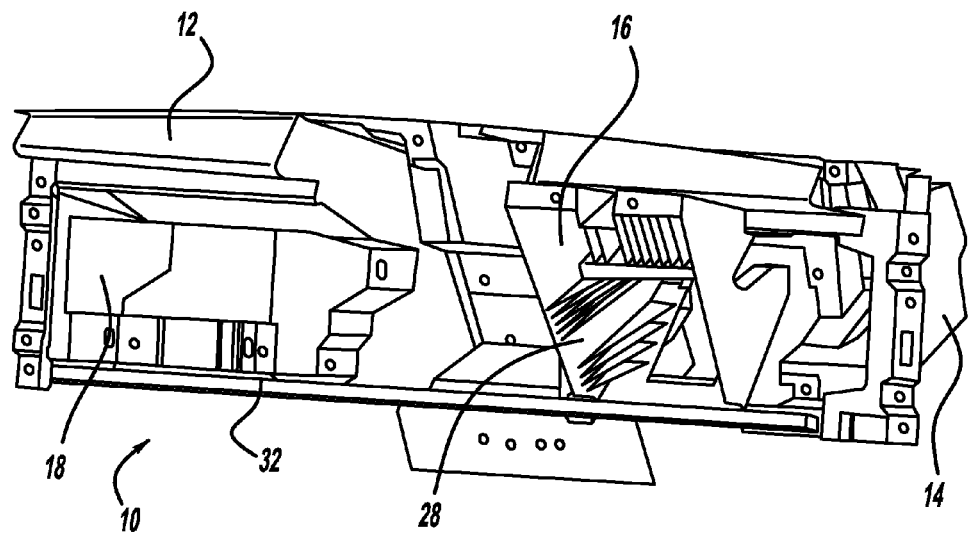
FIG. 2 illustrates a rear perspective view of a cross-car beam assembly according to a preferred embodiment of the disclosed invention.

Referring to FIGS. 1 and 2, respective front and back perspective views of a reinforced cross-car beam assembly according to the disclosed invention, generally illustrated as 10, are shown. The cross-car beam assembly 10 and its associated components set forth in the various figures is intended as being exemplary and not limiting as it is envisioned that a variety of alternative shapes, sizes and configurations of the cross-car beam assembly 10 may be created without deviating from the spirit and scope of the disclosed invention.

Figure 3:
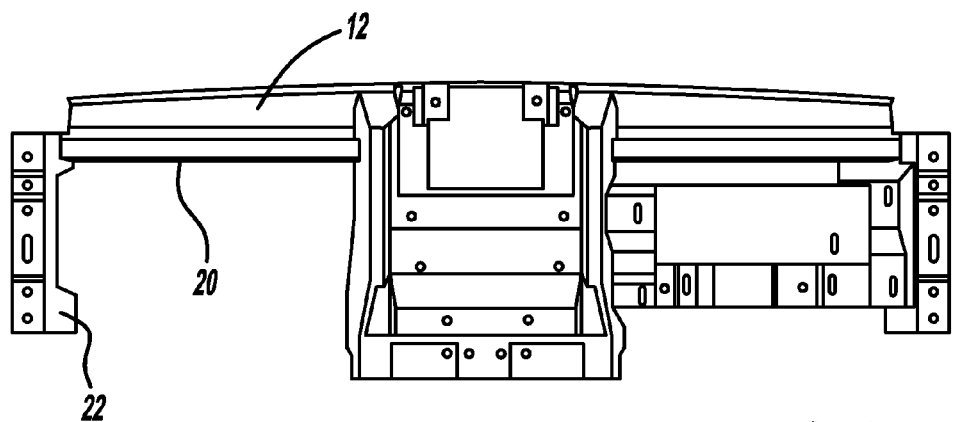
FIG. 3 illustrates a front plan view of the main molding of the cross-car beam assembly according to a preferred embodiment of the disclosed invention.
Figure 4:
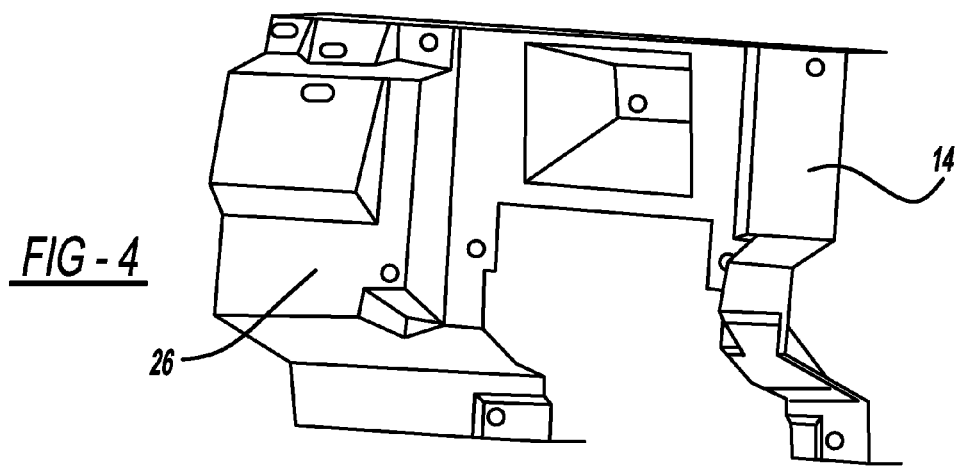
FIG. 4 illustrates a front perspective view of the driver side structure of the cross-car beam assembly according to a preferred embodiment of the disclosed invention.
Figure 5:
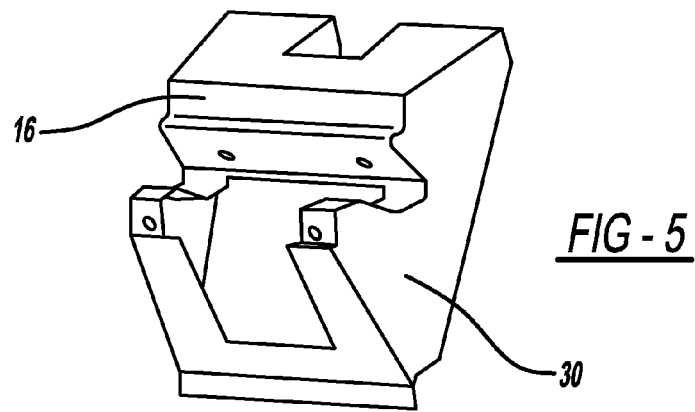
FIG. 5 illustrates a front perspective view of the steering column structure of the cross-car beam assembly according to a preferred embodiment of the disclosed invention.

The cross-car beam assembly 10 includes a main molding 12 (shown in front plan view in FIG. 3), a driver's side structure 14 (shown in perspective view in FIG. 4), and a steering column structure 16 (shown in perspective view in FIG. 5). The main molding 12 includes a forward side 18, a rearward side 20, and a driver's side 22. It is to be understood that while the driver's side 22 is the left side of the main molding 12 the driver's side could as well be the right side of the main molding 12.

The driver's side structure 14 includes a forward side 24 and a rearward side 26. The steering column structure 16 includes a forward side 28 and a rearward side 30.

To form the cross-car beam assembly 10, the forward side 24 of the driver's side structure 14 is generally attached to the rearward side of the main molding 12, as illustrated in FIG. 1. The steering column structure 16 is generally attached to the forward side of the main molding 12, as illustrated in FIG. 2.

To provide for optimum flexibility of the disclosed invention, the main molding 12 may be interchanged with other main moldings having different configurations (not shown), the driver's side structure 14 may be interchanged with other driver's side structures having different configurations (not shown), and the steering column structure 16 may be interchanged with other steering column structures having different configurations (not shown).

One or all of main molding 12, the driver's side structure 14, and the steering column structure 16 may be formed by injection molding or, as a possible variation, by blow molding techniques. In addition, one or all of main molding 12, the driver's side structure 14, and the steering column structure 16 is composed of a polymerized material. A broad variety of polymerizable materials may be used, alone or in combination, including polypropylenes, polyamides (such as Nylon-6,6), polyethylenes, polyphenylene oxides, polystyrenes, polythbutylene terephthalates, acrylonitrile butadiene styrenes (ABS), and polycarbonate acrylonitrle butadiene styrenes (PC/ABS).

To provide the desired strength to these polymerizable materials an internal reinforcement is preferred. Particularly, one or more of the polymerizable materials is reinforced with fibers selected from the group consisting of short glass fiber, short natural fiber, long glass fiber and long natural fiber.

It may be desirable to modify the construction of the cross-car beam assembly 10 by adding one or more tensile members which extend entirely or partially between the ends of the cross-car beam assembly 10 according to vehicle architecture. The tensile member functions to provide the cross-car beam assembly 10 with greater strength to resist both side impact and to avoid vehicle spreading also in the event of an impact.

Figure 6:
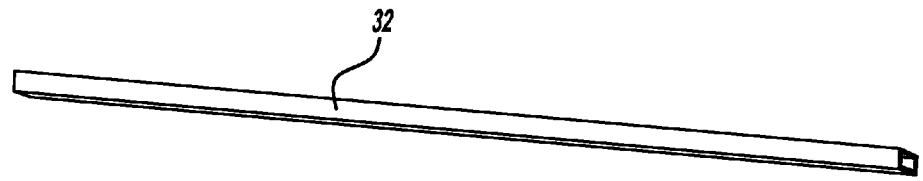
FIG. 6 illustrates a front perspective view of the optional tensile member of the cross-car beam assembly according to a preferred embodiment of the disclosed invention.

An exemplary tensile member is tensile member 32 shown in isolation in FIG. 6 and as part of the cross-car beam assembly 10 in FIG. 2. The number, shape, placement and size of the tensile member 32 as shown is provided only for illustrative purposes and is not intended to be limiting. The tensile member 32 may be composed of a metal or a reinforced polymerized material.

The driver's side structure 14 and the steering column structure 16 may be attached to the main molding 12 by any one of several means, including chemical adhesion, mechanical fixing, and vibration welding. One or more of these components may also be mechanically fastened to the tensile member 32.

Figure 7:
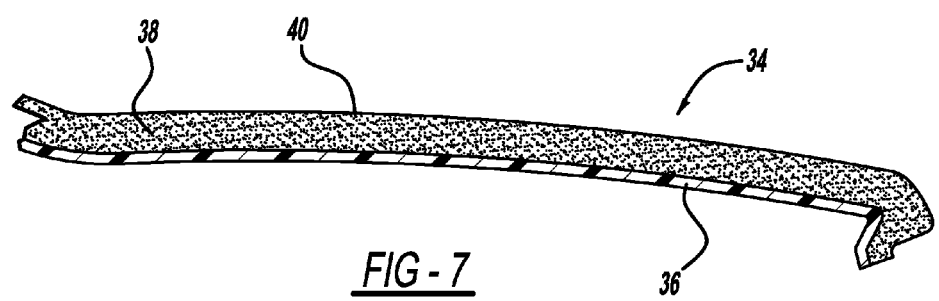
FIG. 7 illustrates a sectional view of an optional foam-in-place construction for one or more components of the disclosed invention.

As a variant of the cross-car beam assembly 10 one or more of the main molding 12, the driver's side structure 14, and the steering column structure 16 may include a foam-in-place construction. Such an arrangement is shown in FIG. 7 in which a cross-section of an exemplary foam-in-place construction, generally identified as 34, is shown. The foam-in-place construction 34 includes a reinforced substrate layer 36 composed of one or more polymerized materials set forth above having one or more fibers also set forth above, a foam intermediate layer 38 comprising a foamed polymer, and an outer skin 40 comprising any one of a variety of polymerized materials known for this purpose.

As a further variant of the cross-car beam assembly of the disclosed invention, a class A part may be attached to the assembly. This embodiment of the disclosed invention is illustrated in FIGS. 8 and 9.

Figure 8:
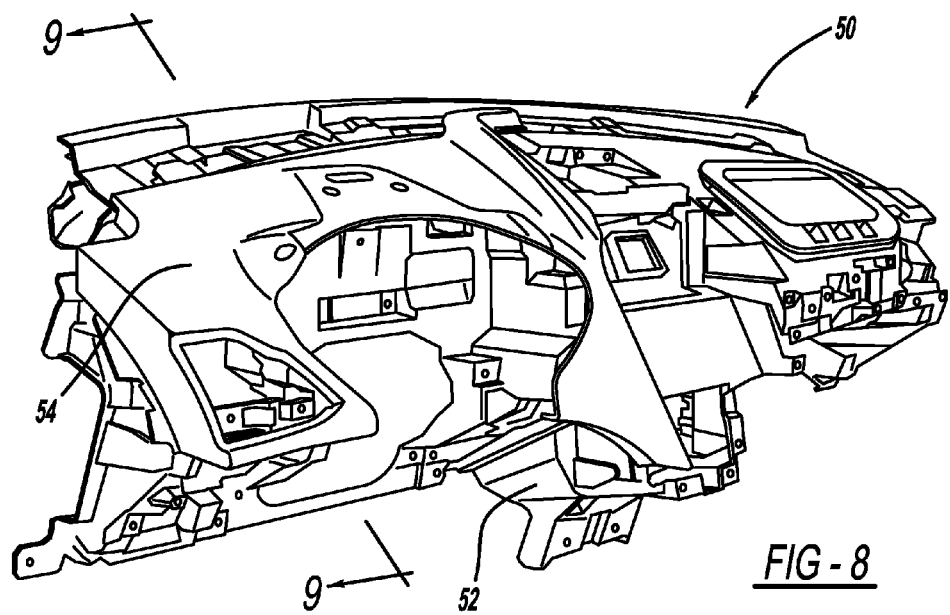
FIG. 8 illustrates an assembly according to the disclosed invention having a class A part attached to a component of the substrate assembly.
Figure 9:
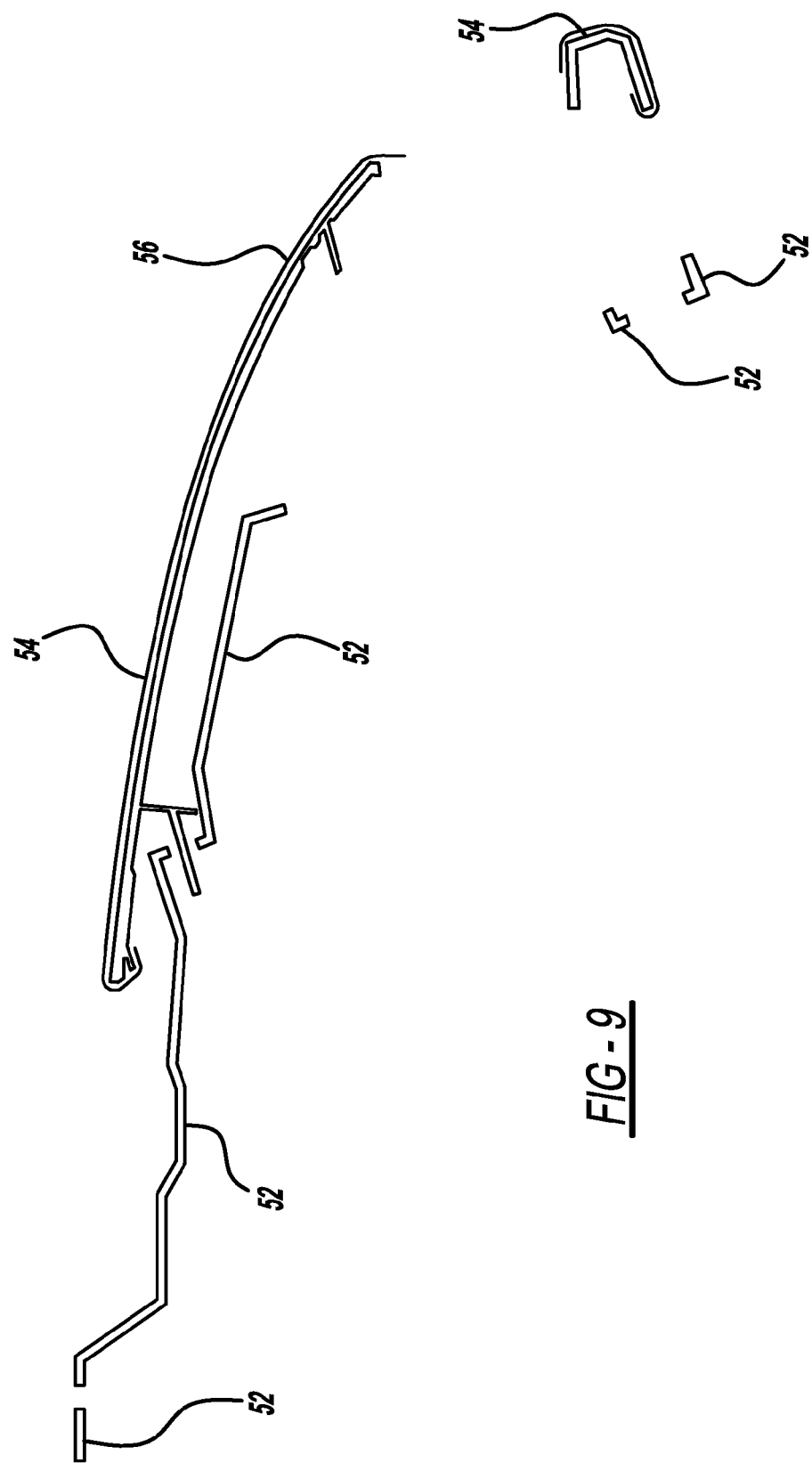
FIG. 9 illustrates a sectional view of the assembly shown in FIG. 8 taken along line 9-9 of FIG. 8.

With respect to FIG. 8, a cross-car beam assembly, generally illustrated as 50, is illustrated in perspective view. As with the cross-car beam assembly 10 discussed above the cross-car beam assembly 50 and its associated components is intended as being exemplary and not limiting as it is envisioned that a variety of alternative shapes, sizes and configurations of the cross-car beam assembly 50 may be created without deviating from the spirit and scope of the disclosed invention.

The cross-car beam assembly 50 includes a fiber-reinforced substrate or main molding 52 which may have attached thereto a number of components such as a driver's side structure and a steering column structure as set forth above with respect to the cross-car beam assembly 10. The fiber-reinforced substrate or main molding 52 is composed of one or more of the polymerizable materials set forth above with respect to the cross-car beam assembly 10.

The cross-car beam assembly 50 includes an instrument panel topper 54 that is attached to the fiber-reinforced substrate or main molding 52. The instrument panel topper 54 and a portion of the fiber-reinforced substrate or main molding 52 is illustrated in cross-section in FIG. 9, taken along lines 9-9 of FIG. 8. In this figure the instrument panel topper 54 includes a class A surface 56. While the instrument panel topper 54 is illustrated as a single component multiple toppers may be attached to the fiber-reinforced substrate or main molding 52. In addition, while the instrument panel topper 54 is illustrated as only partially covering the fiber-reinforced substrate or main molding 52 an alternative configuration of the topper would cover all or substantially all of the fiber-reinforced substrate or main molding 52.

The foregoing discussion discloses and describes exemplary embodiments of the present invention. One skilled in the art will readily recognize from such discussion, and from the accompanying drawings and claims that various changes, modifications and variations can be made therein without departing from the true spirit and fair scope of the invention as defined by the following claims.

What is claimed is:

1. A cross car beam for a vehicle comprising:
a base having an attached cross car tensile member, a driver's side and an opening formed in said driver's side;
a driver side structure attached to said opening, said structure having an opening; and
a steering column structure attached to said opening of said driver side structure, said base, said driver side structure and said steering column structure being separate components molded from reinforced polymerized material.

2. The cross car beam of claim 1 wherein said tensile member is composed of a metal or a reinforced polymerized material.

3. The cross car beam of claim 1 wherein said driver side structure includes a rearward side and wherein said steering column structure is attached to said rearward side.

4. The cross car beam of claim 1 wherein said reinforced polymerized material is selected from the group consisting of polymers or blends of polymers.

5. The cross car beam of claim 1 wherein said reinforced polymerized material is selected from the group consisting of polypropylene, polyamide, polyethylene, polyphenylene oxide, polystyrene, polythbutylene terephthalate, acrylonitrile butadiene styrene (ABS), and polycarbonate acrylonitrle butadiene styrene (PC/ABS).

6. The cross car beam of claim 1 wherein said reinforced polymerized material is reinforced with fibers selected from the group consisting of short glass fiber, short natural fiber, long glass fiber and long natural fiber.

7. A cross car beam for a vehicle comprising:
a molded base having a forward side, a rearward side and a driver's side and further having an opening in said driver's side;
a tensile member attached to said molded base;
a molded driver side structure attached to said opening formed in said driver's side of said base, said structure having a rearward side and an opening; and
a molded steering column structure attached to said opening of said driver side structure on said rearward side of said driver side structure, said driver side and steering column structure being interchangeable with other driver side and steering column structures.

8. The cross car beam of claim 7 wherein at least one of said molded base, said molded driver side structure and said molded steering column structure is composed of a material selected from the group consisting of polymers or blends of polymers.

9. The cross car beam of claim 7 wherein at least one of said molded base, said molded steering column structure, and said molded driver side structure is composed of a material selected from the group consisting of polypropylene, polyamide, polyethylene, polyphenylene oxide, polystyrene, polythbutylene terephthalate, acrylonitrile butadiene styrene (ABS), and polycarbonate acrylonitrle butadiene styrene (PC/ABS).

10. The cross car beam of claim 7 wherein at least one of said molded base, said molded steering column structure, and said molded driver side structure being composed of a polymerized material reinforced with fibers selected from the group consisting of short glass fiber, short natural fiber, long glass fiber and long natural fiber.

11. The cross car beam of claim 7 wherein said tensile member is composed of a metal or a reinforced polymerized material.

12. The cross car beam of claim 7 wherein said molded driver side structure is attached to said forward side of said molded base.

* * * * *